INVENTORS
HAROLD L. DUNEGAN
CLEMENT A. TATRO

United States Patent Office 3,564,927
Patented Feb. 23, 1971

3,564,927
METHOD AND APPARATUS FOR MEASURING PEAK ACCELERATION
Clement A. Tatro and Harold L. Dunegan, Livermore, Calif., assignors to Harold L. Dunegan, Livermore, Calif.
Continuation-in-part of application Ser. No. 666,084, Sept. 7, 1967. This application Feb. 4, 1969, Ser. No. 796,481
Int. Cl. G01p 15/02
U.S. Cl. 73—492          3 Claims

ABSTRACT OF THE DISCLOSURE

A method of and apparatus for determining the peak or maximum acceleration experienced by a unit wherein a mass is disposed in engagement with a rigidly mounted diaphragm for plastically stressing the diaphragm by acceleration forces acting thereon through the mass and subsequently applying a force or pressure to the diaphragm while monitoring the latter for acoustic emission. Such emission commences at the peak stress previously experienced by the diaphragm and this is mathematically converted to peak acceleration.

---

This application is a continuation-in-part application of our co-pending U.S. application Ser. No. 666,084, now Pat. No. 3,447,378, filed in the United States Patent Office in Sept. 7, 1967 for Peak Pressure Measurement by Acoustic Emission.

BACKGROUND OF INVENTION

It has been determined that materials subjected to stresses causing plastic deformation produce acoustic emission. It has furthermore been established that material once subject to a pressure or force causing such deformation does not again produce acoustic emission until the prior maximum pressure is reapplied. Experimentation has been made with a wide variety of materials such as metals, glass, wood and the like and it appears that all such materials exhibit this characteristic. It has been proposed to employ the above-noted characteristics in the testing of materials and in this respect attention is invited to German Pat. No. 852,771 to J. Kaiser. The effect briefly described above is in fact sometimes termed the "Kaiser Effect" and it has been well established by subsequent investigation that the basic premises thereof are correct.

In addition to the disclosure and general understanding of the basic effect noted above, there has been developed a practical method and apparatus for peak pressure measurement by acoustic emission as disclosed and claimed in our above-noted co-pending patent application. Reference is made to such application for a full explanation of practical applications of this effect. Such application is deemed to provide adequate background information for the present invention and disclosure thereof is incorporated herein as required for a further understanding of the present invention.

SUMMARY OF INVENTION

The present invention in brief provides a passive peak acceleration measuring device employing the irreversible acoustic emission effect of materials. More particularly the present invention provides a member, preferably in sheet form, mounted by a rigid container or the like and engaged by a movable mass also retained by such container. The rigid container, as it is herein denominated, is furthermore provided with means for the application of force or pressure to the diaphragm or sheet member.

The method hereof provides for the engagement of a movable mass with a plastically deformable diaphragm or the like in a rigid container under the influence of acceleration of the mass and a subsequent application of an increasing force or pressure to the diaphragm or the like while monitoring same for acoustic emission. Substantially no acoustic emission will be detected in the monitoring above until the diaphragm or member is stressed to the same degree as it experienced during prior peak acceleration stress. This then provides a precise peak acceleration determination.

In common with the peak pressure measurement by acoustic emission set forth in our above-noted co-pending application the operative element or diaphragm of the present invention is originally dimensioned of appropriate material to withstand rupture during peak acceleration to which it may be subjected. As noted in such application, it is necessary that the operative element only plastically deform. Rupture thereof prevents the second cycle application of stress to determine the prior maximum stress applied during acceleration.

In the following description of the present invention the operative member hereof is generically denominated as a diaphragm inasmuch as practical applications of the invention normally employed the material in sheet form restrained about the edges thereof. This term is, however, herein considered to include configurations other than a solid sheet such as for example an apertured sheet or in an extremity a wire constrained at the ends thereof with the mass of the present invention bearing upon the center of same.

The present invention provides a very simple and highly accurate peak acceleration method and apparatus. The apparatus hereof requires no adjustment or calibration and yet provides an absolute and precise measurement of peak acceleration without sources of error inherent in conventional peak acceleration devices. Of course the period of stress by acceleration must be of sufficient duration to overcome any rate effects of plastically deforming the diaphragm.

DESCRIPTION OF FIGURES

The present invention is illustrated as to particular preferred embodiments thereof in the accompanying drawings wherein.

DESCRIPTION OF PREFERRED EMBODIMENTS

Figure 1:
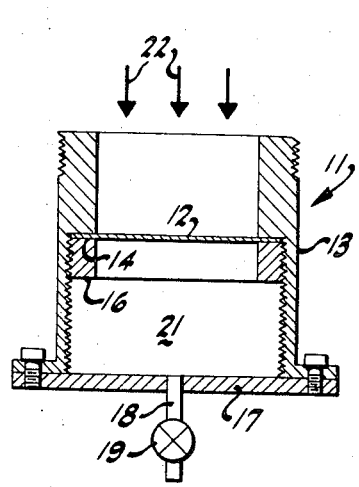
FIG. 1 is a central sectional view taken through a peak pressure measurement device of our above-noted co-pending patent application.

Referring first to FIG. 1 it will be seen to be illustrated a unit 11 mounting a thin diaphragm 12 in peripherally clamped condition. The unit 11 includes a cylindrical housing 13 which may have a shoulder 14 formed internally thereabout and against which the diaphragm 12 is pressed by a retaining ring 16 threaded internally of the housing.

This particular unit provides for exposing an element such as the diaphragm 12 to varying pressures for the purpose of determining the peak applied pressure, and this basic concept is employed in the accelerometer of the present invention. The peak pressure applied to the diaphragm is intended to plastically deform this pressure response element and this may be encouraged by evacuation of the housing at one side of the diaphragm. This is illustrated to be carried out by means of a cover plate 17 bolted to a flange about the housing and having a vacuum line 18 extending through the plate with a valve 19 in the line. Attachment of a vacuum pump to the line 18 and opening of the valve 19 with the diaphragm firmly held in position within the housing will thus cause an evacuation of a chamber 21 defined within the housing between the diaphragm and end plate. Closing of the valve 19 then maintains the vacuum of the housing and the diaphragm is in condition to be exposed to varying pressures as indicated, for example, by the arrows 22 extending through the opposite open end of the housing 13. Such structure is as noted above disclosed and claimed in our above-identified co-pending patent application.

The diaphragm 12 may be formed of a wide variety of materials and of varying thicknesses. It is, however, necessary that the diaphragm be able to withstand the peak applied pressure without rupture in order to be useful in measurement of peak applied pressures such as those generated by peak acceleration. Thus with some knowledge of the expected maximum pressure to be measured the diaphragm, the material and thickness may be readily chosen. One suitable diaphragm material is anodized 6061–T6 aluminum. A diaphragm formed of this material with a thickness of 0.05 inch and a diameter of the order of ¾ inch was found to give a working range of 2000 to 5000 p.s.i.

Figure 2:
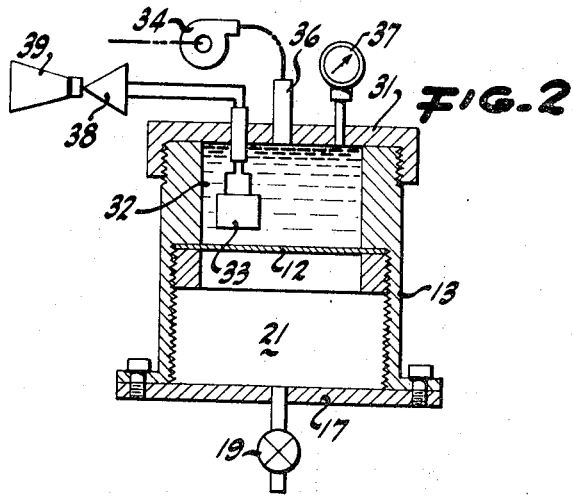
FIG. 2 is a central sectional view taken through the same unit as FIG. 1 and including pressure recreating means and acoustic monitoring means.

The unit illustrated in FIG. 1, either with or without the end plate 17 and attachments, may be employed as an accelerometer in accordance with the present invention by providing a cap 31 threaded on the top of the housing 13 and filling the volume in the housing above the diaphragm 12 with a liquid 32. This is illustrated in FIG. 2. Such a unit is applicable for utilization as a peak pressure measuring device when subsequently operated upon as described below. As shown in FIG. 2 there is provided a transducer such as a piezo-electric crystal 33 disposed adjacent to the diaphragm 12 to monitor acoustic emission and a pump 34 is provided for increasing the pressure above the diaphragm via an inlet pipe 36 through the cap 31. A pressure gauge 37 as shown to communicate with the liquid above the diaphragm for indicating the pressure as it is increased therein by the pump 34. In simple form the invention is operated to produce an electric signal from the piezo-electric crystal 33 upon the initiation of acoustic emission from the diaphragm as the pressure is increased on the diaphragm to the same level as that which the diaphragm previously experienced. Again in simple form it is noted that the crystal 33 has the output thereof coupled through an amplifier 38 driving a speaker indicator 39.

In determining the peak pressure to which the diaphragm 12 has previously been exposed the pressure gauge, pump and piezo-electric crystal and associated circuitry is connected to the unit. The pump, or other pressure increasing means, is then actuated to raise the pressure applied to the diaphragm. Substantially no acoustic emission will occur until the pressure on the diaphragm reaches the previous maximum pressure applied thereto. When the reapplied pressure reaches such peak pressure there will be emitted acoustic energy from the diaphragm and this will operate the crystal so that in the illustrated embodiment an output signal is produced. At such signal the pressure indicated by the gauge 37 is equal to the maximum or peak pressure to which the diaphragm was previously subjected. That the foregoing is indeed the case is illustrated in the plot of FIG. 3 briefly described below.

Figure 3:
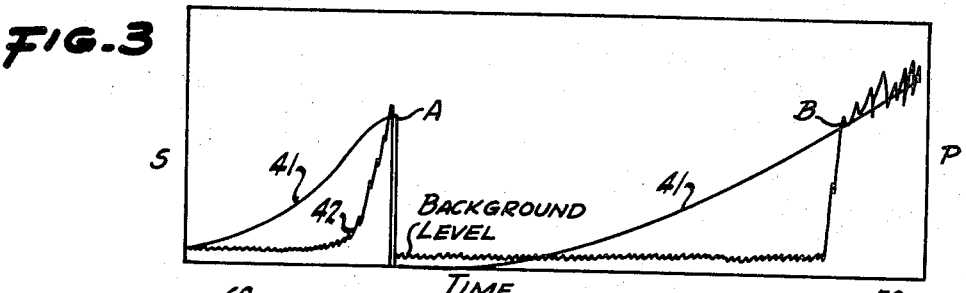
FIG. 3 is a plot of pressure and acoustic emission vs. time illustrating a peak pressure measurement as may be made with the unit of FIG. 2.

With the apparatus set up as illustrated in FIG. 2 the pressure on the diaphragm 12 was gradually increased, as indicated by the plot 41 of pressure versus time in FIG. 3. It will be seen upon reference to FIG. 3 that acoustic emission 42 increased with increasingly applied pressure during the initial pressure application or first cycle. The curve 42 is a plot of acoustic emission, in this case counts per second versus time. With the release of applied pressure on the diaphragm 12, the acoustic emission fell from a maximum at A to a minimum herein indicated as the background level. In order to test the apparatus the pressure was then again increased gradually, as indicated by the curve 41, as a second cycle of pressure application. It is to be particularly noted that the acoustic emission remained substantially constant at the background level as the reapplied pressure was increased until this second cycle of pressure reached substantially the same peak pressure of the first cycle. At this point the acoustic emission jumped, or rose, rapidly to a high level at B substantially equal to the acoustic emission at the peak pressure of the first cycle. Regardless of the relative amounts of acoustic emission it is noted that a very marked increase in acoustic emission occurred at substantially the same pressure as had been previously applied to the specimen 12 and that for lesser pressure substantially no acoustic emission occurred. Consequently, this establishes the capability of the present invention for uses as a passive-pressure transducer for measuring peak pressures. The peak pressure A of the first cycle was, in fact, very clearly identified and established by the substantially instantaneous increase in acoustic emission from an almost zero level to a very substantial level when the reapplied pressure reached this previous peak pressure. Of course, the application of further increasing pressure beyond this point produces additional acoustic emission. The important point, however, is that the maximum peak pressure A of curve 41, i.e., the end of the first cycle of applied pressure, is substantially equal to the pressure at point B of curve 41 during the second cycle of pressure application and as determined by the reestablishment of acoustic emission at such pressure. In this particular test an error of about five percent at peak pressure of somewhat greater than 200 p.s.i. was observed; however, greater accuracy of measurement has been obtained with the present invention, and it is by no means impossible to achieve an accuracy of the order of ninety-seven percent or greater.

With regard to the monitoring of pressure readings, it is normal to employ a somewhat more sophisticated system than that illustrated in FIG. 2. The measurements plotted in FIG. 3 were actually made with a system employing a preamplifier receiving the output of the piezoelectric transducer 33 and feeding into a wideband amplifier that in turn fed a variable bandpass filter removing low-frequency laboratory noises and restricting the acoustic energy to a narrow band around that of the peak response of the transducer. The amplifier acoustic emission signal A, as then applied to a counter, counted the number of events per unit time and this is plotted as the ordinate in FIG. 3. In actual practice the counter applied the output to a digital printer and the digital-to-analog output of the printer was employed to display the acoustic emission as a function of pressure of an xy recorder. In this particular experiment the acoustic emissions were limited to a narrow band about one megacycle; however, various other embodiments of the present invention have been operated at a wide variety of different bandpass frequencies such as, for example, sixty kilocycles.

Figure 4:
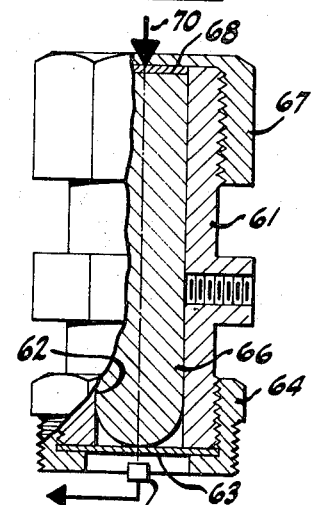
FIG. 4 is a partial sectional view of one preferred embodiment of a peak acceleration unit in accordance with the present invention and schematically illustrating apparatus for second cycle pressurization and acoustic emission monitoring.

Considering now acceleration measurements with the present invention, it is first noted that acoustic emission of a clamped diaphragm or the like is employed to provide a direct determination of peak acceleration experienced by such diaphragm. Referring to FIG. 4 there will be seen to be provided a rigid container 61 formed for example of metal and having cylindrical bore 62 therethrough. Across one open end of this container 61 there is disposed a diaphragm 63 formed of a material capable of withstanding stresses to be experienced without rupture and rigidly clamped to the end of the container about the periphery of the diaphragm. Such clamping may for example be accomplished by an adapter 64 having a hexagonal exterior and threaded onto the end of the container with an internal flange about the outer end thereof bearing upon the diaphragm 63 to firmly anchor same against the rigid container about the periphery of the diaphragm. Within the cylindrical bore 62 or the container 61 there is provided a cylindrical mass 66 slidably engaging the container and having, for example, a spherical lower end bearing against the diaphragm 63. The container is closed by an upper cap 67 threaded onto the opposite end of the container from the diaphragm as illustrated. The exterior of this cap may be hexagonal to facilitate tightening same onto the container. A resilient material 68, such as for example a rubber disc or a spiral spring, is disposed at the opposite end of the mass 66 from the diaphragm and compressed between the cap 67 and the mass. This resilient member 68 thus urges the mass against the diaphragm to eliminate any gap between the mass and diaphragm. As illustrated, the container 61 may have a hexagonal portion about the middle thereof to facilitate engagement thereof with a wrench or the like to assist in tightening of the adapter and cap on the container.

The invention additionally provides for determining the peak acceleration force applied to the diaphragm by subsequently applying an increasing measured force to the diaphragm while monitoring the diaphragm for acoustic emission. In FIG. 4 this is schematically illustrated by the arrow 70 representing an increasing measured force applied to the top of the cylindrical mass 66 and an acoustic emission sensor 71 disposed immediately adjacent the diaphragm 63. The force 70 is steadily increased, as by any conventional means with the cap 67 removed, and the magnitude of this force is measured at the point acoustic emission from the diaphragm commences. This measured force is equal to the peak acceleration force previously applied to the diaphragm by the mass 66. The unit is also preferably provided with some means for attachment to a vehicle or the like which may be subject to acceleration or deceleration to be determined. This may, for example, be accomplished by threads about the exterior of the adapter 64, as shown, and alternatively straps, brackets, or the like may be utilized.

Figure 5:
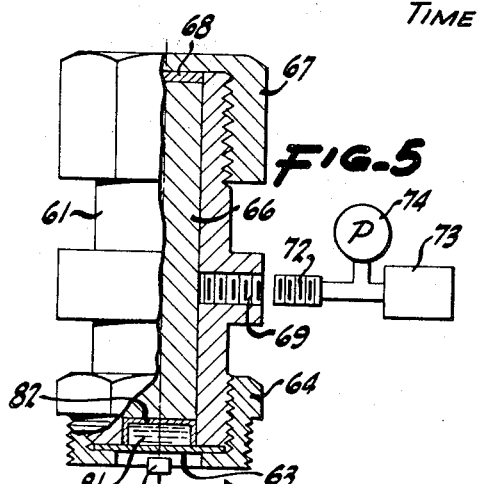
FIG. 5 is a plan view, partially in section, of an alternative embodiment of an accelerometer in accordance with the present invention.

Various alternative physical embodiments of the accelerometer of the present invention are possible and referring to FIG. 5 there is shown a modification of the embodiment of FIG. 4. The majority of the elements of the embodiment of FIG. 5 are the same as those in FIG. 4 and consequently bear the same identifying numerals. There is, however, additionally provided in the unit of FIG. 5 a liquid, or possibly a plastic of very low shear strength, disposed between the mass 66 and the diaphragm 63. This liquid 81 may be confined to the volume between the mass and diaphragm by a rubber boot or the like 82 to insure that such liquid does not move upwardly alongside of the mass in the container bore during the application of acceleration forces which urge the mass toward the diaphragm.

After the unit is subjected to some unknown peak acceleration which it is desired to determine, the diaphragm 63 is subjected to a second cycle of increasing pressure and this may be accomplished through a pressure fitting 69 in the container, as for example, by a threaded fitting 72 extending from some means of applying an increasing liquid pressure therethrough such as a pump and reservoir 73. A pressure gauge 74 is connected to this fitting 72 for monitoring the level of pressure applied. Further in accordance with the present invention acoustic emission of the diaphragm 63 is monitored or detected during this reapplication of pressure thereto. Such is illustrated to be accomplished by an acoustic detector 76 such as some type of piezo-electric crystal disposed in close proximity to the diaphragm and producing a signal that may be amplified and visually or audibly monitored, so that the pressure at which such emission commences may be recorded.

In the instance wherein the liquid pressure is applied to the diaphragm through the pressure fitting 69 the cylindrical mass 66 is fitted within the cylindrical bore 62 of the container in such a way that fluid from the fitting 72 may pass along the bore of the container to the diaphragm 63. This may be accomplished either by providing a relatively loose sliding engagement between the mass and container or by providing one or more channels extending from the pressure fitting 69 to the diaphragm 63 internally of the container.

In operation of the device of FIG. 5 the unit is assembled as shown and firmly anchored to a vehicle that may be subjected to acceleration or deceleration. After some peak acceleration of the vehicle which is to be determined the unit may be removed therefrom if desired, and pressure applied to the connection 72 for restressing the diaphragm 63. With the acoustic detector 76 disposed adjacent to the diaphragm the second cycle pressure is increased slowly to the point at which acoustic emission occurs. This pressure may then be directly converted to acceleration. This may be readily understood by noting that Newton's Second Law provides that force (F) equals mass (M) times acceleration ($a$) and furthermore that the force exerted on the diaphragm by the subsequently applied pressure (P) is equal to such pressure multiplied by the cross-sectional area (A) of the diaphragm. Consequently, from these relationships it follows that $a=P$ ($A/M$). The area of the diaphragm exposed to the applied pressure is known and the mass of the element 66 is known so it is only necessary to multiply the pressure as read by the gauge 74 by this constant $A/M$ at the initiation of second cycle acoustic emission to directly determine the peak acceleration experienced by the unit.

Figure 6:
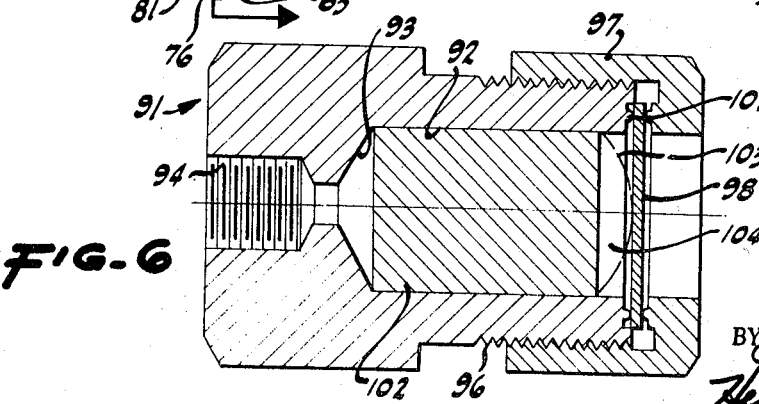
FIG. 6 is a central sectional view of a further embodiment of an accelerometer in accordance with the present invention.

Another physical embodiment of the present invention is illustrated in FIG. 6 wherein the number of parts of the unit is minimized. As shown in FIG. 6 there is provided a rigid housing 91 which may for example have a hexagonal left end as illustrated for ready gripping by a wrench or the like. Within this housing there is provided a cylindrical bore 92 extending from the right end thereof part way through the housing. This bore then has a tapered portion 93 communicating with a tapped opening 94 through the left end of the housing for attachment of pressurizing connections. About the open end of the housing there are provided threads 96 and a hexagonal threaded cap 97 as provided to thread upon this end of the housing, as shown. A diaphragm 98 is disposed across the open end of the bore 92 in the housing and the cap 97 is tightened onto the diaphragm to peripherally clamp the diaphragm in position across the bore. It will be noted that the open end of the housing 91 has a small annular ridge about the portion engaging the end of the housing so as to provide for ring clamping of the diaphragm as illustrated.

In this embodiment of the present invention the housing 91 is provided with a cylindrical mass 102 slidably disposed within the bore 92 of the housing. The mass may have a curved end as indicated by the dotted line 103 for engagement with the diaphragm and the length of the cylindrical mass 102 is made such that it fits tightly within the bore insofar as length of the latter is concerned, i.e., the flat end of the mass engages the outer edge of the inclined or tapered portion 93 of the opening in the housing. Consequently the housing itself firmly forces the mass against the diaphragm. Alternatively this embodiment may provide for the disposition of a liquid 104 between the diaphragm and mass. In this embodiment the cylindrical mass 102 may tightly fit the bore in the housing to prevent the liquid 104 from passing thereabout or as in FIG. 5 additional provision may be made for insuring maintenance of the liquid at the desired location. In either of the instances wherein the mass directly contacts the diaphragm or the liquid is disposed between the mass and diaphragm the other end of the cylindrical mass is firmly held by the tapered end of the bore in the housing so that the mass is directly or indirectly firmly engaged with the diaphragm.

In operation of this embodiment of the present invention the same initial considerations pertain as those discussed above. The diaphragm is formed of an appropriate material and proper dimensions to withstand rupture under the maximum force that may be applied thereto by acceleration or deceleration of the unit. Rapid acceleration of the unit to the left of FIG. 6 will be seen to apply a force to the diaphragm proportional to the peak acceleration. With a fluid or the like between the mass and diaphragm, a second cycle of pressurization is then performed through the opening 94, as by means of a liquid or other fluid which will force the mass against the diaphragm to again stress the diaphragm and with the aid of an acoustic emission detector the pressure at which acoustic emission reoccurs is determined and the above-noted constant is employed as a multiplier for such pressure to give a positive and precise determination of prior peak acceleration and deceleration experienced by the unit.

Although the invention hereof has been described with respect to particular preferred embodiments of the apparatus and steps of the method it is not intended to limit the invention to the terms of the description or details of illustration. Reference is made to the appended claims for a precise definition of the invention.

We claim:

1. Apparatus for measuring peak acceleration comprising:
    a unit including a rigid container with a diaphragm secured across an open end thereof and a mass disposed within the container in movable relation thereto and at all times bearing upon the diaphragm for stressing the diaphragm as a function of acceleration of the unit, said diaphragm being capable of plastic deformation under stress without rupture over a predetermined range of stresses,
    an acoustic emission sensor adapted for disposition adjacent said diaphragm subsequent to acceleration of said unit,
    means engageable with said unit for applying an increasing pressure to said diaphragm, and
    means measuring applied pressure and indicating the value thereof at initiation of acoustic emission,
    whereby the pressure applied at first indicated acoustic emission is the pressure experienced by said diaphragm at prior peak acceleration of said unit.

2. A method of measuring peak acceleration comprising the steps of:
    (a) engaging a movable mass with a flexible rigidly mounted diaphragm whereby acceleration of the mass flexes the diaphragm,
    (b) subjecting said mass and diaphragm to acceleration,
    (c) applying a gradually increasing pressure to said diaphragm,
    (d) measuring pressure applied in step (c), and
    (e) monitoring acoustic emission of said diaphragm during application of said increasing pressure to determine the pressure at initiation of acoustic emission,
    whereby the pressure at initiation of acoustic emission is directly proportional to peak acceleration experienced by mass and diaphragm.

3. The methods of claim 2 further defined by applying said increasing measured pressure to said diaphragm through said mass.

References Cited

UNITED STATES PATENTS

| | | | |
|---|---|---|---|
| 2,677,270 | 5/1954 | Sanderson | 73—71.2 |
| 2,883,995 | 4/1959 | Bialous et al. | 137—85 |
| 2,909,739 | 10/1959 | Cherniak | 336—30 |
| 2,974,531 | 3/1961 | Ackerman | 73—516 |
| 3,020,505 | 2/1962 | Bourns et al. | 73—517 |

OTHER REFERENCES

Kinkel et al. "Automatic Calibration of Transducers" in Instruments, October 1953.

JAMES J. GILL, Primary Examiner

H. GOLDSTEIN, Assistant Examiner